United States Patent
Coeckelbergs et al.

(10) Patent No.: US 11,988,211 B2
(45) Date of Patent: May 21, 2024

(54) VACUUM PUMP

(71) Applicant: Leybold GmbH, Cologne (DE)

(72) Inventors: Joeri Coeckelbergs, Turnhout (BE); Vicente Paul Guerrero Lule, Cologne (DE)

(73) Assignee: Leybold GmbH, Cologne (DE)

( * ) Notice: Subject to any disclaimer, the term of this patent is extended or adjusted under 35 U.S.C. 154(b) by 0 days.

(21) Appl. No.: 17/263,957

(22) PCT Filed: Aug. 1, 2019

(86) PCT No.: PCT/EP2019/070782
§ 371 (c)(1),
(2) Date: Jan. 28, 2021

(87) PCT Pub. No.: WO2020/025754
PCT Pub. Date: Feb. 6, 2020

(65) Prior Publication Data
US 2021/0310488 A1   Oct. 7, 2021

(30) Foreign Application Priority Data
Aug. 1, 2018 (DE) .................... 20 2018 003 585.8

(51) Int. Cl.
*F04C 28/08* (2006.01)
*F04C 25/02* (2006.01)
*F04C 28/28* (2006.01)

(52) U.S. Cl.
CPC ............. *F04C 28/08* (2013.01); *F04C 25/02* (2013.01); *F04C 28/28* (2013.01); *F04C 2240/81* (2013.01)

(58) Field of Classification Search
CPC .......... F04C 28/08; F04C 25/02; F04C 28/28; F04C 2240/81
See application file for complete search history.

(56) References Cited

U.S. PATENT DOCUMENTS 4,699,570 A    10/1987  Bohn
5,486,966 A *   1/1996  Ahn .......................... G11B 5/11
                                                         360/271.1
(Continued)

FOREIGN PATENT DOCUMENTS

CN       102753827 A    10/2012
DE    102012102405 A1    9/2013
(Continued)

OTHER PUBLICATIONS

Mugaeast et al., Managing Information Systems (5th Edition), Sep. 2015, pp. 124-128, Donghei University of Finance & Economics Press.

*Primary Examiner* — Connor J Tremarche
(74) *Attorney, Agent, or Firm* — The Webb Law Firm

(57) ABSTRACT

A vacuum pump includes a housing having an inlet and an outlet, at least one rotor arranged in the housing configured to convey a gaseous medium from the inlet to the outlet, a motor configured to rotate the rotor, a control device connected to the motor configured to control the motor, and at least one sensor connected to the control device. The at least one sensor is configured to sense at least one operating parameter of the vacuum pump. The control device comprises a correlation module. The correlation module is configured to correlate the sensed at least one operating parameter with at least one critical parameter. The motor is controlled on the basis of the at least one critical parameter.

10 Claims, 2 Drawing Sheets

(56) References Cited

U.S. PATENT DOCUMENTS

| | | | | |
|---|---|---|---|---|
| 5,486,996 | A * | 1/1996 | Samad | G05B 13/027 |
| | | | | 700/32 |
| 6,343,656 | B1 * | 2/2002 | Vazquez | F04B 47/02 |
| | | | | 73/861.43 |
| 2003/0077187 | A1 * | 4/2003 | Kabasawa | F04D 19/048 |
| | | | | 417/423.4 |
| 2004/0267395 | A1 | 12/2004 | Discenzo et al. | |
| 2006/0248031 | A1 * | 11/2006 | Kates | G16H 50/20 |
| | | | | 706/15 |
| 2008/0306892 | A1 * | 12/2008 | Crossley | G01F 1/74 |
| | | | | 706/16 |
| 2009/0317261 | A1 | 12/2009 | Bruce | |
| 2011/0200450 | A1 * | 8/2011 | Shelley | F04B 49/20 |
| | | | | 417/1 |
| 2015/0000315 | A1 | 1/2015 | Blumhardt | |
| 2016/0076535 | A1 * | 3/2016 | Clifton | F04B 49/065 |
| | | | | 73/168 |
| 2017/0292513 | A1 * | 10/2017 | Haddad | F04B 1/04 |
| 2017/0302065 | A1 * | 10/2017 | Roldan | G06Q 50/06 |
| 2018/0025269 | A1 * | 1/2018 | Dursun | E21B 41/00 |
| | | | | 175/24 |
| 2019/0154030 | A1 * | 5/2019 | Brett | F04B 49/065 |
| 2019/0277135 | A1 * | 9/2019 | Zha | E21B 49/003 |

FOREIGN PATENT DOCUMENTS

| | | |
|---|---|---|
| DE | 102013223020 A1 | 5/2015 |
| DE | 202015003927 U1 | 7/2015 |
| GB | 2502134 A | 11/2013 |
| JP | 863248984 A | 10/1988 |

\* cited by examiner

VACUUM PUMP

CROSS-REFERENCE TO RELATED APPLICATIONS

This application is the U.S. national phase of International Application No. PCT/EP2019/070782 filed Aug. 1, 2019, and claims priority to German Patent Application No. 20 2018 003 585.8 filed Aug. 1, 2018, the disclosures of which are hereby incorporated by reference in their entirety.

BACKGROUND

Field

The present disclosure relates to a vacuum pump, and in particular a dry compression two-shaft pump, as well as a method for operating a vacuum pump.

Background Art

Known vacuum pumps comprise a housing having and inlet and an outlet. In the housing a rotor is arranged which is driven by an electric motor and thus rotated. The rotor comprises rotor elements which cooperate with a stator or rotor elements of a second rotor such that a gaseous medium is conveyed from the inlet to the outlet.

In particular in the case of dry compression two-shaft pumps it is required to provide a small distance between the rotor elements of the rotors and the rotor elements and the stator, respectively, for avoiding a backflow of the pumping medium and thus achieve a good pump performance. The distance is, however, defined by the operating temperature of the vacuum pump as well as the rotational speed of the rotors. Thus the distance is to be designed such that even in the case of non-optimum operation parameters, such as high inlet temperature, high temperature of the gas flowing in or high temperature of the cooling liquid, for example, a contact of the rotor and the housing and/or the second shaft is prevented. Thus in conventional pumps the size of the distance between rotor element and stator and rotor element of a second rotor, respectively, is selected such that the distance includes a safety margin. Thereby, however, the pump output is reduced.

It is possible to sense the distance between the rotor element and the housing and the rotor element of the second shaft, respectively by means of a sensor. However, such sensing is complex and thus expensive.

Another critical parameter during the operation of a vacuum pump is the temperature of the bearings which support the rotors. The bearings are heated due to the rotation of the rotors, wherein a limit temperature must not be exceeded since an existing lubricant would decay above the limit temperature and thus lose its lubrication properties. Further, the bearing temperature is also limited by the thermal deformation. However, high speed, high inlet pressure, high temperatures of the inlet gas as well as high cooling water temperature contribute to the temperature of the bearing such that the speed of the rotor must be correspondingly adapted so that even at the poorest operating conditions possible the limit temperature for the bearings is not reached. For this purpose, the maximum possible rotational speed of the rotors is reduced, whereby the pumping output also decreases.

SUMMARY

It is an object of the disclosure to provide a vacuum pump as well as a method for operating a vacuum pump which is inexpensive to manufacture and produces an optimum performance.

This object is achieved by a vacuum pump according to the appended claims.

The vacuum pump according to the disclosure, which is in particular a dry compression two-shaft pump, comprises a housing having an inlet and an outlet. In the housing a rotor is arranged which is in particular rotatably supported by bearings. The rotor in particular comprises at least one rotor element. Further, a motor for driving the rotor is provided such that the rotor is rotated, wherein the rotation of the rotor causes a gaseous medium to be conveyed from the inlet to the outlet. Further, the vacuum pump comprises a control device connected to the motor for controlling the motor, wherein in particular the speed of the motor is controlled.

According to the disclosure, a sensor is provided for sensing at least one operating parameter of the pump, wherein the sensor is connected to the control device. The control device comprises a correlation module, wherein the correlation module is configured for correlating the sensed operating parameter with a critical parameter of the vacuum pump. Then the motor is controlled by means of the control device on the basis of the critical parameter, wherein in particular the speed of the motor is controlled. Thus, from the at least one sensed operating parameter of the pump a critical parameter of the vacuum pump is derived on the basis of which the motor is controlled. It is no longer required to provide a safety margin of the respective critical parameter which ensures that in every operating situation of the vacuum pump a limit value of the critical parameter is prevented from being exceeded. The vacuum pump according to the disclosure can thus always produce an optimum output as a function of the existing operating parameters.

Preferably, more than one sensor are provided. The provision of more than one sensor allows for sensing more than one operating parameter, in particular a plurality of operating parameters, of the vacuum pump. Thus, a plurality of operating parameters are available which can be correlated with a critical parameter. Alternatively, it is possible that an operating parameter is sensed by more than one sensor, in particular at different positions on the vacuum pump.

Preferably, the sensed operating parameter is one or more of the following values: temperature of the inlet gas, temperature of the outlet gas, temperature of the cooling medium flowing in, wherein the cooling medium is in particular water, temperature of the cooling medium flowing out, wherein the cooling medium is in particular water, rotational speed of the motor, motor output, wherein the motor output is in particular determined by the power consumption or the phase shift between the exciting voltage and the rotation of the rotor of the electric motor, cooling medium flow rate, vibration as well as inlet pressure and outlet pressure. These are operating parameters which are easy to measure. In particular, the sensors required for this purpose are inexpensive.

Preferably, the critical parameter is the distance between rotor and/or stator or housing. In particular, when a two-shaft pump is provided, the critical parameter can also be the distance between the two provided rotors. Alternatively or additionally, the bearing temperature can be selected as the critical parameter. In particular, more than one critical parameter can be taken into account. Generally speaking, the critical parameter is a parameter of the vacuum pump which, when a limit value thereof is exceeded, leads to damage of the vacuum pump or failure of the vacuum pump.

Preferably, the correlation module is configured for correlating the operating parameter and the critical parameter by means of a regression or a fuzzy logic or, generally, a machine learning algorithm, preferably by means of a regression or a regression module based on machine learning.

Preferably, the correlation module is configured for correlating the operating parameter and the critical parameter by means of a correlation function. Here, the underlying correlation function can be based on a model of the vacuum pump. Thus each operating parameter or a plurality of operating parameters are assigned to a specific value of the critical parameter or the critical parameters on the basis of the correlation function such that the critical parameter(s) can be directly derived from the sensed operating parameter or the plurality of sensed operating parameters.

Preferably, the correlation module comprises a neural network, wherein the neural network is in particular configured as a recursive neural network. Here, the operating parameter and the critical parameter are correlated with each other by means of the neural network. Provision of the neural network allows for the operating parameter or a plurality of operating parameters to be correlated with a critical parameter without reverting to a specific model.

Preferably, the neural network is trained, wherein, first, at least one sensor is provided for at least one critical parameter. For training purposes, the sensed operating parameter is used as an input value and the critical parameter is used as an output value. Here, the output value is compared with the critical parameter determined by the sensor used for the training, and thereby the neural network is trained. The training must be performed merely once for each pump type, i.e. for each different vacuum pump. Once a suitably trained neural network exists, it can be implemented in the controls of further vacuum pumps of the same type or vacuum pumps with merely negligible modifications. Thus, a sensor for the at least one critical parameter is required only during the training. During the actual operation a sensor for the critical parameter is not required.

Preferably, the vacuum pump does not comprise a sensor for the critical parameter. In particular, the vacuum pump does not comprise a sensor for any critical parameter. Since the sensors for critical parameters are in particular expensive sensors, omission of these sensors can result in a considerable reduction of the costs for the vacuum pump.

Preferably, the control device is configured for reducing the rotational speed of the rotor when the critical parameter exceeds a predefined limit value. Thus, damage of the vacuum pump is prevented.

Preferably, the rotational speed is increased when the critical parameter does not reach a predefined limit value. This is in particular essentially the same limit value as described above. Thereby it is ensured that always an optimum operating performance is achieved as a function of the existing operating conditions which are defined by the various operating parameters.

Further, the disclosure relates to a method for operating a vacuum pump, in particular a pump as described above.

BRIEF DESCRIPTION OF THE DRAWINGS

Hereunder the disclosure will be explained in detail on the basis of a preferred embodiment with reference to the accompanying Figure in which.

DETAILED DESCRIPTION

Figure 1:
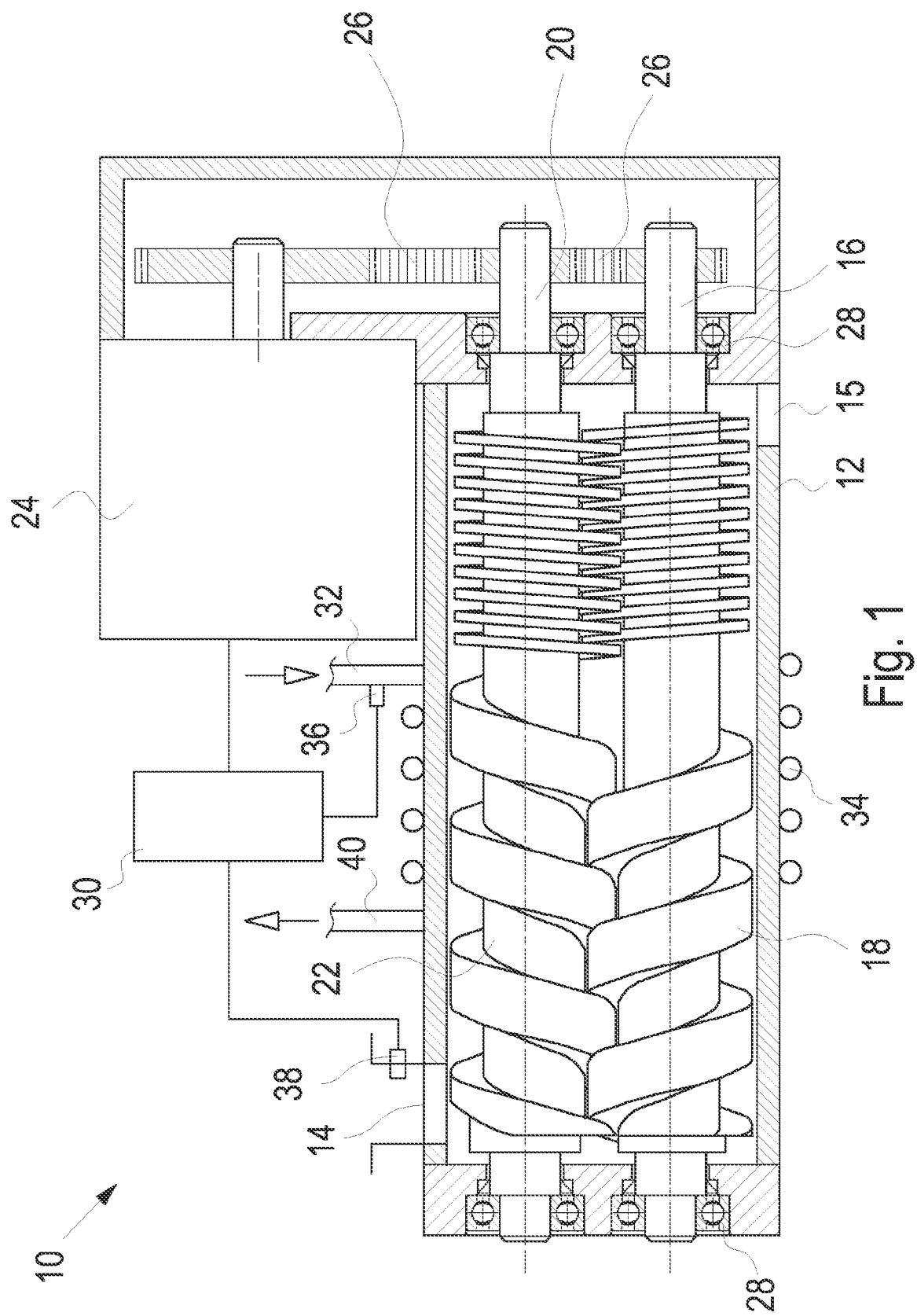
FIG. 1 shows a schematic diagram of a two-shaft pump according to the present disclosure.

The vacuum pump 10 according to the disclosure, configured as a screw pump in the illustrated exemplary embodiment, comprises a housing 12 having an inlet 14 and an outlet 15. In the housing 12 a first shaft 16 having helical rotor elements 18 is arranged. In parallel thereto, a second shaft 20 is arranged in the housing 12, said second shaft having helical rotor elements 22 which engage with the rotor elements 18 of the first shaft 16. Further, an electric motor 24 is provided which drives and rotates the two shafts 16, 20 via a gear 26. For this purpose, the shafts 16, 20 are rotatably supported by bearings 28. Due to the two shafts 16, 20 and the pump elements 18, 22 connected to the shafts 16, 20 rotating in opposite directions, a gaseous medium is pumped from the inlet 14 to the outlet 15.

The vacuum pump 10 according to the disclosure further comprises a control device 30 for controlling the electric motor 24. The control device 30 has connected thereto various sensors for sensing operating parameters of the vacuum pump 10. For example, in FIG. 1 a sensor 36 is configured as temperature sensors arranged at the inlet 32 of a cooling medium supply system 34 of the housing 12. This sensor 36 senses the temperature of the cooling medium flowing in, wherein the cooling medium is in particular water. Another sensor 38 connected to the control device 30 senses the temperature of the inlet gas at the inlet 14. Further operating parameters can also be sensed by sensors, wherein the operating parameters further are the outlet temperature at the outlet 15, the temperature of the cooling medium flowing out at the outlet 40 of the cooling medium supply system 34, the rotational speed of the rotor elements 18, 22, the motor output of the electric motor 24, the cooling medium flow rate of the cooling medium supply system 34, vibrations of the vacuum pump 10 at the housing 12, the inlet pressure at the inlet 14 and/or the outlet pressure at the outlet 15, for example.

Individual, a plurality of or all of these aforementioned operating parameters are sensed by the control device 30. The control device 30 comprises a correlation module, wherein the sensed operating parameters are correlated with critical parameters of the vacuum pump 10. Then the control device 30 controls the electric motor 24 of the vacuum pump 10 as a function of the thus determined critical parameters. The critical parameters are the distance of the rotor elements 18, 22 to each other or the respective distance of the rotor elements 18, 22 to the housing 12, for example. If the rotor elements 18, 22 come in contact with each other or with the housing 12, this results in serious damage or even destruction of the vacuum pump. The control device 30 controls the vacuum pump on the basis of the determined operating parameters and the thus correlated critical parameters for reducing the rotational speed to prevent such contact, for example. Direct sensing of the critical parameters is not required here. Another critical parameter is the bearing temperature of the bearings 28. Since the lubrication of the bearings 28 is no longer ensured when a limit temperature is exceeded, this may result in a destruction of the bearings 28. Further critical parameters may also be included, wherein each parameter of the vacuum pump is considered a critical parameter for which a limit value exists such that, when this limit value is exceeded, proper operation of the vacuum pump is no longer ensured and the vacuum pump may even be damaged or destroyed.

Figure 2:
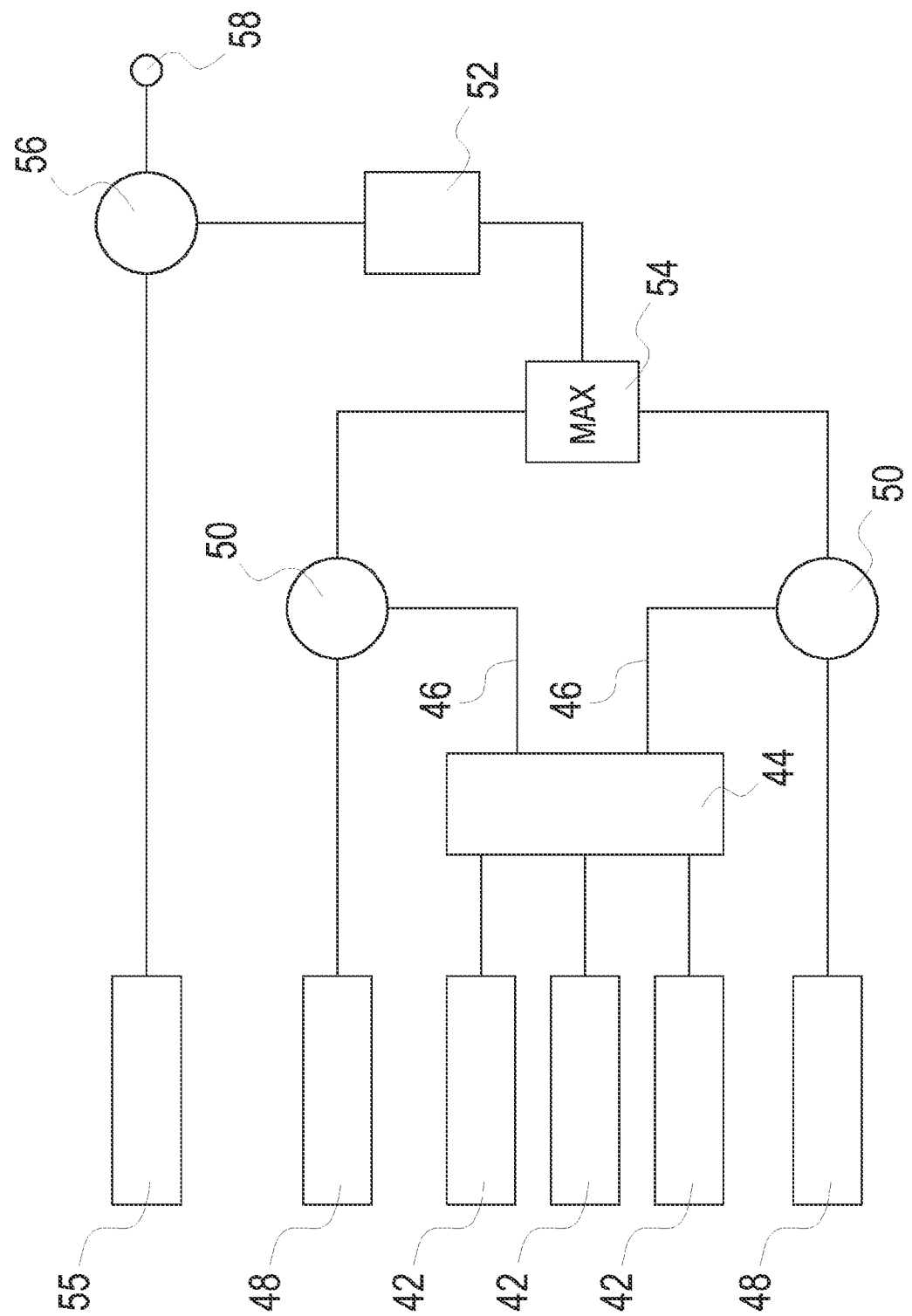
FIG. 2 shows a control diagram of the vacuum pump of FIG. 1.

FIG. 2 shows a control diagram. Here, a plurality of operating parameters 42 are fed into a correlation module 44. In the example shown in FIG. 2, three operating parameters 42 are used. However, the number is not limited to this number such that more or fewer operating parameters 42 can be used and transferred to the correlation module 44.

In particular, the correlation module 44 is a neural network which can be configured as a model based on machine learning which correlates the operating parameters 42 with one or more critical parameters of the vacuum pump. For this purpose, the neural network of the correlation module is trained in a suitable manner. In particular, a sensor exclusively used for training purposes is provided at the vacuum pump, which sensor directly determines/measures the critical parameter which is later to be derived on the basis of the operating parameters during operation. Here, a plurality of critical parameters can be involved. The method for training the neural network comprises the following steps:

a) determining the at least one operating parameter;
b) correlating with a value for the at least one critical parameter;
c) comparing the determined value of the critical parameter with the critical parameter measured by the sensor provided for training purposes;
d) in the case of non-conformance or too large a deviation: adapting the neural network and again performing steps a) to d);
e) in the case of conformance or a deviation below a predefined limit value: terminating the training;
f) transfer the thus trained neural network to vacuum pumps of the same type.

Here, the vacuum pumps including the thus transmitted neural network in the respective correlation module do in particular not comprise any sensor for directly measuring the critical parameter.

In the exemplary embodiment of FIG. 2, two critical parameters 46 are provided, such as the distance of the rotor elements to the housing 12 and to each other, respectively, and the bearing temperature of the bearings 28. The critical parameters 46 determined from the operating parameters 42 by the correlation module 44 are then compared with predefined limit values 48 in comparators 50. Sensors for direct measurement of the critical parameters are not provided. If the critical parameter 46 determined by means of the correlation module 44 exceeds the predefined limit value 48, the control element 52 causes the rotational speed to be adapted and in particular the rotational speed to be reduced. If more than one determined critical parameter 46 exceed the respective limit values 48, the maximum element 54 allows for merely the larger amount of exceeding to be taken into account. A reduction of the rotational speed by the control element 52 due to the larger amount of exceeding results in the smaller amount of exceeding of the other critical parameter to be cancelled out.

However, if the critical parameters 46 determined by means of the correlation module 44 fall below the predefined limit values 48, the control element 52 causes the rotational speed to be increased. However, for this purpose, an absolute maximum value of the rotational speed is defined as a limit value 55. The increase of the rotational speed caused by the control element 52 is compared with the limit value 55 in the comparator 56. If the maximum allowable rotational speed is not yet reached, the increase of the rotational speed is forwarded to the electric motor 24. For this purpose, the control diagram of FIG. 2 comprises a connection 58 which is connected to the electric motor 24.

The method for operating a vacuum pump as described above thus includes the following steps:

a) measuring at least one operating parameter;
b) correlating the measured operating parameter with at least one critical parameter;
c) comparing the determined critical parameter with a predefined limit value;
d) controlling the motor and in particular adapting the speed as a function of the comparison performed.

Thus the vacuum pump 10 need not be designed for the poorest operating conditions possible but the operation can be dynamically adapted to the existing operating parameters, wherein care is always taken that critical parameters for the operation of the vacuum pump do not exceed the predefined limit values. However, if the critical parameters fall below the limit values, an increase of the rotational speed and thus the pump output is allowed for.

The invention claimed is:

1. A vacuum pump, comprising
a housing having an inlet and an outlet,
at least one rotor arranged in the housing configured to convey a gaseous medium from the inlet to the outlet,
a motor configured to rotate the rotor,
a control device connected to the motor configured to control the motor, and
at least one sensor connected to the control device, wherein the at least one sensor is configured to sense at least one operating parameter of the vacuum pump,
wherein the control device comprises a correlation module, wherein the correlation module comprises a neural network, and the neural network is trained so that a sensor for at least one critical parameter is required only during training, and
wherein the correlation module is configured to correlate the sensed at least one operating parameter with the at least one critical parameter, and wherein the motor is controlled on the basis of the at least one critical parameter, and
further wherein the correlation module correlates the at least one operating parameter and the at least one critical parameter by means of at least one of: a regression algorithm, a fuzzy logic algorithm, or a machine learning algorithm,
wherein the at least one rotor of the vacuum pump comprises a first rotor wherein the at least one critical parameter is at least one of a distance between the first rotor and the housing or a bearing temperature, or
wherein the at least one rotor comprises a first rotor and a second rotor, and wherein the at least one critical parameter is at least one of a distance between the first rotor and the housing, a distance between the second rotor and the housing, a distance between the first rotor and the second rotor or a bearing temperature.

2. The vacuum pump according to claim 1, wherein the sensed at least one operating parameter is at least one of: inlet gas temperature, outlet gas temperature, inlet cooling medium temperature, outlet cooling medium temperature, rotational speed, motor output, cooling medium flow rate, vibration, inlet pressure, or outlet pressure.

3. The vacuum pump according to claim 1, wherein the correlation module correlates the at least one operating parameter and the at least one critical parameter by means of a correlation function.

4. The vacuum pump according to claim 1, wherein the correlation module comprises a recursive neural network and correlates the at least one operating parameter and the at least one critical parameter by means of the neural network.

5. The vacuum pump according to claim 4, wherein the neural network comprises a training, wherein during the training the vacuum pump further comprises the sensor configured to measure the at least one critical parameter, and wherein during the training the sensed at least one operating parameter is used as an input value and the at least one critical parameter is used as an output value.

6. The vacuum pump according to claim 1, wherein the vacuum pump does not comprise a sensor configured to measure the at least one critical parameter during operation of the vacuum pump.

7. The vacuum pump according to claim 1, wherein the control device is configured to reduce a rotational speed of the rotor if the at least one critical parameter exceeds a predefined limit value.

8. The vacuum pump according to claim 1, wherein, when the at least one critical parameter falls below a predefined limit value, a rotational speed of the rotor is increased.

9. A method of operating a vacuum pump, comprising:
measuring at least one operating parameter of the vacuum pump;
correlating, by a correlation module, the measured at least one operating parameter with at least one critical parameter of the vacuum pump, wherein the correlation module comprises a neural network, and the neural network is trained so that a sensor for the at least one critical parameter is required only during training;
comparing the determined at least one critical parameter with a predefined limit value; and
controlling a motor of the vacuum pump and adapting the speed of the motor as a function of the comparison performed, wherein the correlation module correlates the at least one operating parameter and the at least one critical parameter by means of at least one of: a regression algorithm, a fuzzy logic algorithm, or a machine learning algorithm,
wherein the at least one rotor of the vacuum pump comprises a first rotor wherein the at least one critical parameter is at least one of a distance between the first rotor and the housing or a bearing temperature, or
wherein the at least one rotor comprises a first rotor and a second rotor, and wherein the at least one critical parameter is at least one of a distance between the first rotor and the housing, a distance between the second rotor and the housing, a distance between the first rotor and the second rotor or a bearing temperature.

10. The method according to claim 9, wherein the correlation module and the neural network of the correlation module are trained with the following steps:
   a) determining the at least one operating parameter;
   b) correlating with a value for the at least one critical parameter;
   c) comparing the determined value of the at least one critical parameter with the at least one critical parameter measured by a sensor used during training of the correlation module and the neural network;
   d) in the case of non-conformance or too large a deviation: adapting the correlation module and the neural network and repeating steps a) to d);
   e) in the case of conformance or a deviation below a predefined limit value: terminating the training; and
   f) transmitting the trained neural network to vacuum pumps of the same type.

* * * * *